United States Patent
Lim et al.

(10) Patent No.: US 10,445,871 B2
(45) Date of Patent: Oct. 15, 2019

(54) IMAGE ANALYSIS NEURAL NETWORK SYSTEMS

(71) Applicant: General Electric Company, Schenectady, NY (US)

(72) Inventors: Ser Nam Lim, Schenectady, NY (US); Xiao Bian, Niskayuna, NY (US); David Scott Diwinsky, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 142 days.

(21) Appl. No.: 15/600,948

(22) Filed: May 22, 2017

(65) Prior Publication Data
US 2018/0336674 A1    Nov. 22, 2018

(51) Int. Cl.
| | |
|---|---|
| G06K 9/62 | (2006.01) |
| G06T 7/00 | (2017.01) |
| G06K 9/00 | (2006.01) |
| G06K 9/46 | (2006.01) |

(52) U.S. Cl.
CPC ........ G06T 7/0006 (2013.01); G06K 9/00201 (2013.01); G06K 9/4628 (2013.01); G06K 9/6271 (2013.01); G06T 7/97 (2017.01); G06T 2207/20081 (2013.01); G06T 2207/20084 (2013.01); G06T 2207/30164 (2013.01)

(58) Field of Classification Search
None
See application file for complete search history.

(56) References Cited

U.S. PATENT DOCUMENTS

| 5,590,218 A | 12/1996 | Ornstein | |
|---|---|---|---|
| 2007/0009252 A1* | 1/2007 | Heyworth | .......... G01N 21/8806 396/155 |
| 2010/0066824 A1* | 3/2010 | Burton | ..................... B26D 7/30 348/89 |
| 2011/0041474 A1* | 2/2011 | Gerez | .................... B64D 45/00 60/223 |

(Continued)

FOREIGN PATENT DOCUMENTS

| CN | 104636751 A | 5/2015 |
|---|---|---|
| CN | 105279495 A | 1/2016 |

(Continued)

OTHER PUBLICATIONS

Rorrer et al ("Deep Learning Applications Across the Breadth of Geoint", Nvidia GPU Technology Conference, May 8 (Year: 2017).*

(Continued)

*Primary Examiner* — Randolph I Chu
(74) *Attorney, Agent, or Firm* — Christopher R. Carroll; The Small Patent Law Group LLC

(57) ABSTRACT

A method includes obtaining a series of images of a rotating target object through multiple revolutions of the target object. The method includes grouping the images into multiple, different sets of images. The images in each of the different sets depict a common portion of the target object. At least some of the images in each set are obtained during a different revolution of the target object. The method further includes examining the images in at least a first set of the multiple sets of images using an artificial neural network for automated object-of-interest recognition by the artificial neural network.

20 Claims, 5 Drawing Sheets

(56) References Cited

U.S. PATENT DOCUMENTS

| | | | | |
|---|---|---|---|---|
| 2014/0003939 | A1* | 1/2014 | Adams | F03D 7/0224 |
| | | | | 416/1 |
| 2015/0043769 | A1* | 2/2015 | Newman | G01N 25/72 |
| | | | | 382/100 |
| 2016/0099010 | A1 | 4/2016 | Sainath et al. | |
| 2016/0292872 | A1* | 10/2016 | Hammond | G01S 17/66 |
| 2016/0350653 | A1 | 12/2016 | Socher et al. | |
| 2018/0122060 | A1* | 5/2018 | Shirkhodaie | G06T 7/001 |

FOREIGN PATENT DOCUMENTS

| | | |
|---|---|---|
| CN | 105550699 A | 5/2016 |
| CN | 106096568 A | 11/2016 |
| WO | 2016206765 A1 | 12/2016 |

OTHER PUBLICATIONS

Bellantonio et al; "Hybrid CNN+LSTM for Face Recognition in Videos" University Department in Valparaiso, Chile; Dec. 16, 2016; 30 pages.

Donahue et al.; "Long-Term Recurrent Convolutional Networks for Visual Recognition and Description" Proceedings of the IEEE conference on computer vision and pattern recognition; Nov. 30, 2015; 14 pages.

Ng et al.; "Beyond Short Snippets: Deep Networks for Video Classification" Proceedings of the IEEE conference on computer vision and pattern recognition; 2015; 9 pages.

Goodfellow et al.; "Generative Adversarial Nets" Advances in Neural Information Processing Systems; Montreal University; 2014; 9 pages.

Karpathy; "CS231n Convolutional Neural Networks for Visual Recognition" http://cs231n.github.io/convolutional-networks/; 2017; 26 pages.

Nielsen; "Using neural nets to recognize handwritten digits [Electronic resourse]—Electronic data." Mode of access: http://neuralnetworksanddeeplearning.com/chap1.html; 2016; 54 pages.

Long et al. "Fully Convolutional Networks for Semantic Segmentation" Proceedings of the IEEE Conference on Computer Vision and Pattern Recognition; 2015; 10 Pages.

"CS231n Convolutional Neural Networks for Visual Recognition" http://cs231n.github.io/convolutional-networks/; 2017; 15 pages.

Jeong, H., et al., "Rotating Machinery Diagnostics Using Deep Learning on Orbit Plot Images," Procedia Manufacturing, Elsevier, vol. 5, pp. 1107-1118 (2016).

Johns, E., et al., "Pairwise Decomposition of Image Sequences for Active Multi-View Recognition," IEEE Conference on Computer Vision and Pattern Recognition (CVPR), pp. 3813-3822 (Jun. 27, 2016).

Su, H., et al., "Multi-view Convolutional Neural Networks for 3D Shape Recognition," IEEE International Conference on Computer Vision (ICCV), pp. 945-953 (Dec. 7, 2015).

Zhao, R., et al., "Deep Learning and Its Applications to Machine Health Monitoring: A Survey," Arxiv.Org, Cornell University, p. 2 (Dec. 16, 2016) (Abstract).

Extended European Search Report and Opinion issued in connection with corresponding EP Application No. 18173296.7 dated Sep. 19, 2018.

\* cited by examiner

IMAGE ANALYSIS NEURAL NETWORK SYSTEMS

FIELD

The subject matter described herein relates to image analysis systems that use one or more neural networks.

BACKGROUND

Neural networks can be used to analyze images for a variety of purposes. For example, some neural networks can examine images in order to identify objects depicted in the images. The neural networks can be established or modified (e.g., trained) to detect various objects in images by providing the neural networks with labeled training images. The labeled training images include images having known objects depicted in the images, with each pixel in the labeled training images identified according to what object or type of object the pixel at least partially represents.

But, the process for labeling training images is a time-consuming, costly, and/or laborious process. While some crowd-sourcing approaches have been used to reduce the time and/or cost involved in labeling the training images, not all images are available for public dissemination for the crowd-sourcing solutions. For example, medical images can be subject to laws that restrict dissemination of the images, images of certain objects (e.g., airplane engines) may not be open to public dissemination due to contractual and/or governmental restrictions, other images may be subject to privacy laws that restrict public dissemination, etc.

SUMMARY

In one embodiment, a method (e.g., for analyzing images) includes obtaining a series of images of a rotating target object through multiple revolutions of the target object. The method includes grouping the images into multiple, different sets of images. The images in each of the different sets depict a common portion of the target object. At least some of the images in each set are obtained during a different revolution of the target object. The method further includes examining the images in at least a first set of the multiple sets of images using an artificial neural network for automated object-of-interest recognition by the artificial neural network.

In one embodiment, a system (e.g., an image analysis system) includes a digital memory and one or more processors. The digital memory stores an artificial neural network. The one or more processors are configured to obtain a series of images of a rotating target object through multiple revolutions of the target object. The one or more processors are configured to group the images into multiple, different sets of images. The images in each of the different sets depict a common portion of the target object. At least some of the images in each set are obtained during a different revolution of the target object. The one or more processors are further configured to examine the images in at least a first set of the multiple sets of images using the artificial neural network stored in the memory for automated object-of-interest recognition by the artificial neural network.

In one embodiment, a method (e.g., for analyzing images) includes obtaining video of a rotating rotor assembly through multiple revolutions of the rotor assembly. The video includes a series of image frames over time. The rotor assembly includes multiple blades. The method includes grouping the image frames of the video into multiple, different sets of image frames. The image frames in each of the different sets depict a common blade of the rotor assembly. At least some of the image frames in each set are obtained during a different revolution of the rotor assembly. The method also includes examining the image frames in at least a first set of the multiple sets of image frames using an artificial neural network for automated object-of-interest recognition by the artificial neural network. The image frames in the first set depict a first blade of the rotor assembly, and the artificial neural network is configured to recognize at least one of spalling or cracks on the first blade as objects-of-interest.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
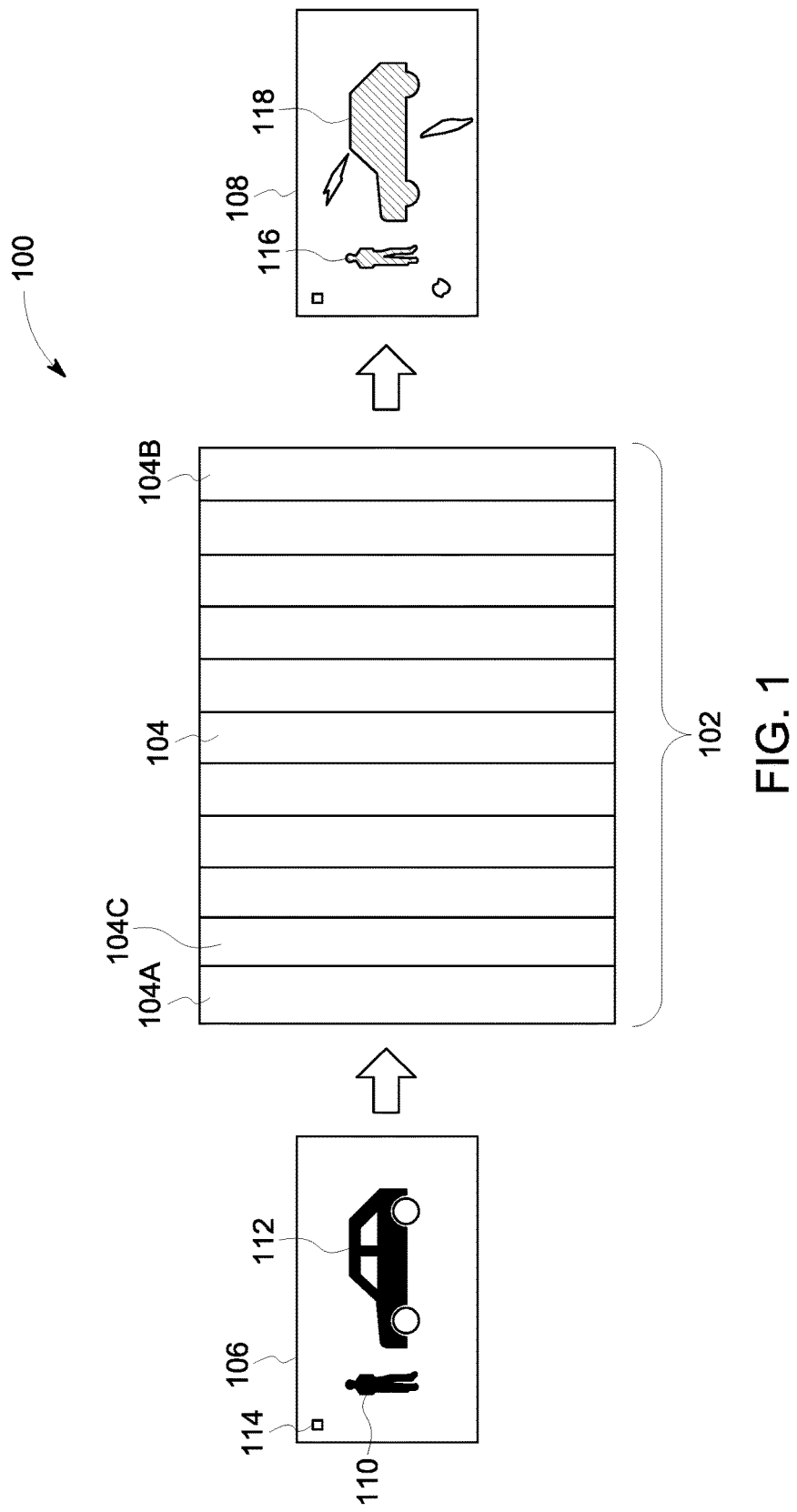
FIG. 1 illustrates one embodiment of a neural network system used for image analysis.

One embodiment of the inventive subject matter described herein provides an image analysis system and method that examine sets of image frames in an artificial neural network for predicting the presence of objects-of-interest in the image frames. The system and method improve the comprehension and depth of what is learned by neural networks from images by combining information from multiple image frames in a corresponding set of image frames that are obtained at different times. For example, information gleaned from previously-examined image frames in a set can be used by the neural network when analyzing a current image frame in the same set, instead of analyzing the current image frame in a "vacuum" without reference to previously-examined image frames. The information gleaned from previously-examined image frames may improve various functions of the neural network, such as increasing the speed at which the neural network can analyze the current image frame, improving the accuracy of the neural network at detecting and/or classifying an object-of-interest in the current image frame, and/or allowing the neural network to track an object-of-interest over time in different image frames. The object-of-interest depicted in the image frames may be, for example, spalling on a thermal barrier coating on a blade of a rotor assembly or a crack in the blade.

In general, artificial neural networks include artificial neurons, or nodes, that receive input images and perform operations (e.g., functions) on the images, selectively passing the results on to other neurons. Weight values are associated with each vector and neuron in the network, and these values constrain how input images are related to outputs of the neurons. Weight values can be determined by the iterative flow of training data through the network. For example, weight values are established during a training phase in which the network learns how to identify particular object classes by typical input data characteristics of the objects in training or ground truth images.

During the training phase, labeled training or ground truth images are input into the artificial neural network. A labeled training image is an image where all or a substantial portion of the pixels forming the image are associated with an object class. An object class is a type or category of an object appearing in the image. For example, a human body can be one object class, and an automobile is a different, second object class.

A pixel can be labeled (e.g., associated) with probabilities that the pixel represents various different object classes by a vector [a b c d], where the values of a, b, c, and d indicate the probability of the pixel representing each of different classes of objects or things. In a labeled training image, a pixel labeled as [1 0 0 0] can indicate that there is a 100% probability that the pixel represents at least a portion of an object of a first class (e.g., object class human body represented by probability a), a zero probability that the pixel represents at least a portion of an object of a different, second class (e.g., object class automobile represented by probability b), a zero probability that the pixel represents at least a portion of an object of a different, third class (e.g., object class ground represented by probability c), and a zero probability that the pixel represents at least a portion of an object of a different, fourth class (e.g., object class tree represented by probability d).

Video analytics can be difficult to analyze using conventional artificial neural networks due to long-term temporal relationships between image frames as well as complex visual features in each image frame that is input to the neural network. For example, a camera that acquires a video feed of a moving target object may obtain some image frames of a first portion of the target object and other image frames of a different, second portion of the target object. Introducing the video data to a conventional artificial neural network may make object prediction difficult and time-intensive because the neural network has to analyze each image frame independently.

The system and method can input sets of image frames (or image data) obtained at different times to the neural network, which helps the neural network by providing temporal context to make a more accurate prediction of the objects depicted in the image frames and/or to track the objects depicts in the image frames without additional learning or data (e.g., without use of additional labeled training images). For example, the image frames in a common set may all depict a common object or a common portion of an object, although the object type or class of that common object or portion thereof may not be known prior to examining in the neural network. This approach of grouping image frames acquired at different times into sets can be independent of the architecture of the deep learning system or neural network.

Furthermore, in one or more embodiments, the neural network is a recurrent neural network that uses long-term information from previous image frames for video analytics. The recurrent neural network may be a long short term memory (LSTM) network that combines long-term information from previous frames with spatial (e.g., visual) features from convolutional neural networks to provide an accurate prediction of an object class in a current frame. For example, long-term information from previous frames is stored as a hidden (or cell) state in successive LSTM cells or layers. The information in the hidden state influences how a current input feature is analyzed and used, and also influences the information that is passed onto the subsequent LSTM layer as the hidden state. Therefore, the system and method described herein may be better able to timely analyze video data for accurate object detection than currently known systems by grouping related image frames into sets and examining the sets in a recurrent neural network, such as an LSTM network.

At least one technical effect of the systems and methods described herein includes the rapid and accurate identification of objects depicted in one or more image frames of a video for a variety of end uses, such as for the identification and repair of damage to a component (e.g., repair of a thermal barrier coating in an engine), the automatic changing of movement of a vehicle (e.g., changing a direction of movement and/or applying brakes in response to identifying a person or other object in an image), or the like. In medical applications, the systems and methods can rapidly and accurately identify tumors, lesions, or the like, from images and the systems and methods can automatically implement one or more medical procedures to remove or repair the identified tumor or lesion.

FIG. 1 illustrates one embodiment of a neural network system 100 used for image analysis. The neural network system 100 provides automated object-of-interest detection and recognition in images using one or more deep neural networks 102. The neural network 102 is an artificial neural network formed from one or more processors (e.g., microprocessors, integrated circuits, field programmable gate arrays, or the like). The neural network 102 is divided into two or more layers 104, such as an input layer 104A that receives an input image 106, an output layer 104B that outputs an output image 108, and one or more intermediate layers 104C between the input layer 104A and the output layer 104B. The layers 104 of the neural network 102 represent different groups or sets of artificial neurons or nodes, which can represent different functions performed by the one or more processors on the input image 106 to identify objects in the input image 106. The artificial neurons apply different weights in the functions applied to the input image 106 to attempt to identify the objects in the input image 106. The output image 108 is generated by the neural network 102 by assigning or associating different pixels in the output image 108 with different object classes (described below) based on analysis of characteristics of the pixels. Because the neural network 102 may not be 100% accurate in predicting what objects are represented by different pixels, the output image 108 may not exactly resemble or depict the objects in the input image 106, as shown in FIG. 1.

The artificial neurons in the layers 104 of the neural network 102 can examine individual pixels 114 that form the input image 106. The processors (operating as the artificial neurons) can use linear classification to calculate classification scores for different categories of objects (referred to herein as "classes"), such as a tree, a car, a person, spalling of a thermal barrier coating, a crack in a surface, a sign, or the like. These classification scores can indicate the probability that a pixel 114 represents different classes. For example, the classification score for a pixel 114 can be represented as a vector (e.g., the vector [a b c d] described above). The classification score is referred to herein as a classification vector. Each artificial neuron can apply a mathematical function, such as an activation function, to the same pixel, with the functions applied by different neurons impacting the functions applied by other neurons. Different neurons may apply different weights to different terms in the functions than one or more, or all other neurons. Application of the functions generates the classification vectors for the pixels 114, which can be used to identify the objects in the input image 106.

In one embodiment, the input image 106 is provided to the neural network 102 via one or more wired and/or wireless connections from a source, such as a camera or borescope. The neurons in the layers 104 of the neural network 102 examine the characteristics of the pixels 114 of the input image 106, such as the intensities, colors, or the like, to determine the classification vectors for the various pixels 114. The layers 104 of artificial neurons in the neural network 102 can examine the input image 104 in sequential order, with a first intermediate (or hidden) layer 104C of the neurons examining each pixel 114, followed by the neurons in a second intermediate layer 104C, followed by the neurons in a third intermediate layer 104C, and so on, to calculate the classification vectors of the pixels 114. The application of functions to characteristics of a pixel 114 by the neurons in a layer 104 is based on the results of the functions applied by the neurons in the preceding layers 104 in the neural network 102.

After the layers 104 of the neural network 102 have determined the classification vectors for the pixels 114, the neural network 102 examines the classification vector of each pixel 114 and determines which object class has the highest probability for each pixel 114 or which object class has a higher probability than one or more, or all, other object classes for each pixel 114. For example, a first pixel in the input image 106 having a classification vector of [0.6 0.15 0.05 0.2] indicates that the neural network 102 calculated a 60% probability that the first pixel represents a first object class (e.g., a human body or person), a 15% probability that the first pixel represents a second object class (e.g., a car), a 5% probability that the first pixel represents a third object class (e.g., a tree), and a 20% probability that the first pixel represents a fourth object class (e.g., the ground).

The output image 108 is a representation based on the determined probabilities for the pixels 114 in the input image 106. For example, different areas 116, 118 in the output image 108 are representative of the objects 110, 112, respectively, in the input image 106. The areas 116, 118 may slightly represent the corresponding objects 110, 112, but do not accurately represent or indicate the objects 110, 112 due to the probabilities in the classification vectors for at least some of the pixels 114 being less than 100%. The processors can determine that each pixel 114 represents the object class having the greatest or largest probability in the corresponding classification vector for that pixel 114. For example, the processors can determine that the first pixel described above represents a human person due to the 60% probability. This process can be repeated for several, or all, other pixels 114 in the input image 106. As described above, additional training of the neural network 102 using labeled training images or ground truth images can improve the accuracy of the neural network 102 at recognizing objects in images that are input into the neural network 102, such that the objects 116, 118 in the output image 108 more closely resemble the corresponding objects 110, 112 in the input image 106. Additional training of the neural network 102 can improve the accuracy by increasing the determined probabilities that given pixels represent specific classes of the multiple object classes. The probabilities are increased by modifying the weights and/or functions of the artificial neurons in the different layers 104.

Figure 2:
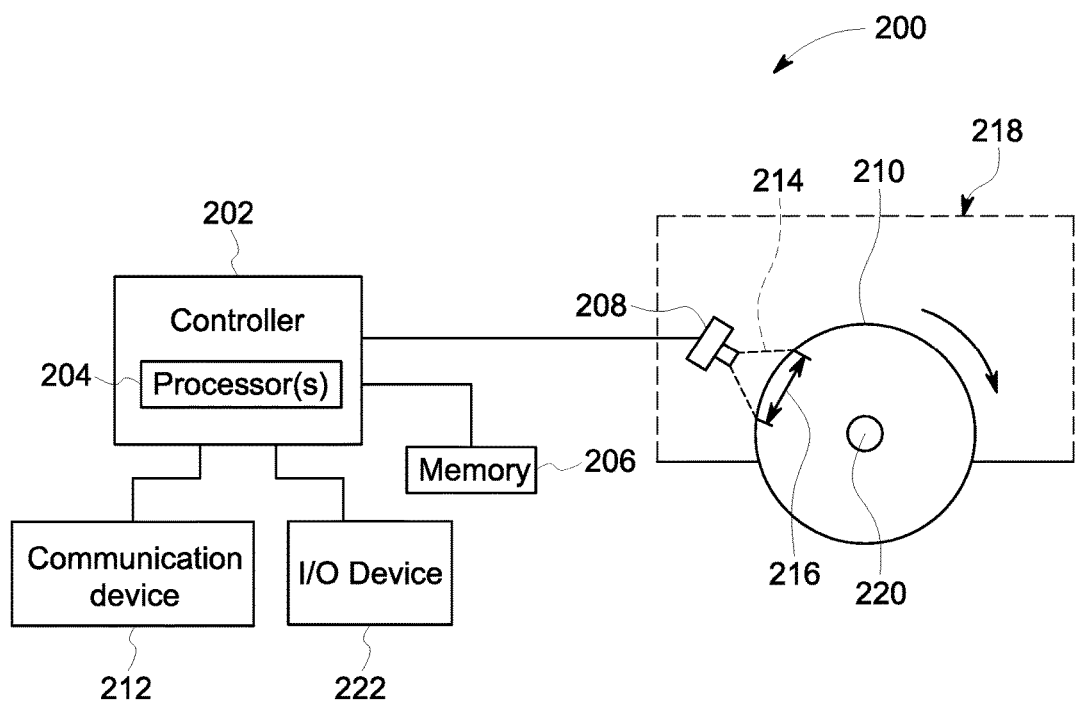
FIG. 2 is a block diagram of an image analysis system that uses the neural network system according to an embodiment.

FIG. 2 is a block diagram of an image analysis system 200 according to an embodiment. The image analysis system 200 uses the neural network system 100 shown in FIG. 1. The image analysis system 200 includes a controller 202 that is operably coupled to a digital memory 206, which is a tangible and non-transitory computer readable medium. The controller 202 is configured to control the operation of the image analysis system 200. The controller 202 includes one or more processors 204. The controller 202 includes and/or represents one or more hardware circuits or circuitry that include, are connected with, or that both include and are connected with one or more processors, controllers, and/or other hardware logic-based devices. The controller 202 may include a central processing unit (CPU), one or more microprocessors, a graphics processing unit (GPU), or any other electronic component capable of processing inputted data according to specific logical instructions. For example, the controller 202 may execute instructions stored on the memory 206 or stored on another tangible and non-transitory computer readable medium. In one embodiment, the memory 206 stores the neural network 102 shown in FIG. 1. The memory 206 may represent a flash memory, RAM, ROM, EEPROM, and/or the like. The controller 202 provides input images to the memory 206 for examining the input images using the neural network 102 for automatic object detection in the input images.

The controller 202 is configured to obtain a series of images of a rotating target object. The series of images is acquired over time by an imaging device. The series of images is referred to herein as image frames of a video. It is recognized that the use of the term "video" to represent the series of images does not necessarily mean that all of the image frames are acquired in one continuous recording session by an imaging device. For example, some of the image frames may be acquired during a first recording session, and other image frames may be acquired during a second recording session that does not start immediately after the first recording session ends due to a delay period. In an embodiment, the image analysis system 200 includes an imaging device 208 that is positioned to obtain video of a target object 210. The imaging device 208 may be a camera, a borescope, or the like that is configured to acquire image frames representing the video at a designated frame acquisition rate. The imaging device 208 may communicate the video to the controller 202 via a wired or a wireless pathway. For example, the imaging device 208 may be configured to wirelessly transmit or broadcast the acquired video to the controller 202.

The controller 202 may be operably coupled to a communication device 212 that receives the video from the imaging device 208 and forwards the video to the controller 202 for analysis. The communication device 212 may include hardware such as a transceiver, receiver, transmitter, and/or the like, and associated circuitry (e.g., antennas) wirelessly communicating (e.g., transmitting and/or receiving) with the imaging device 208. The communication device 212 may also be configured to wirelessly communicate with a remote server, a mobile device (e.g., held by an operator), or the like. The communication device 212 may be configured to establish a bi-directional communication link with a communicating device, such as the imaging device 208, using protocol firmware that may be stored in the memory 206 or another tangible and non-transitory computer readable medium. For example, the protocol firmware may provide network protocol syntax for the communication device 212 to assemble data packets, establish and/or partition data received along the bi-directional communication links, and/or the like. In an alternative embodiment, the controller 202 and/or communication device 212 obtains the video from a remote server, a mobile device, or the like, instead of directly from the imaging device 208.

The imaging device 208 captures or acquires image data of the target object 210 within a field of view 214 of the imaging device 208, which represents the area of inspection captured in the image frames of the video. In the illustrated embodiment, the field of view 214 of the imaging device 208 does not include the entire target object 210, but rather includes only a portion 216 of the target object 210. In an embodiment, the target object 210 is configured to rotate along multiple revolutions, and the imaging device 208 is positioned to acquire video of target object 210 as the target object 210 rotates. In the illustrated embodiment, the target object 210 is a wheel, such as a wheel of a vehicle 218, that rotates about an axle 220. The vehicle 218 may be an automobile, a rail vehicle (e.g., a locomotive), an off-road construction or mining vehicle, or the like. In an alternative embodiment, instead of a wheel the target object 210 may be a rotor assembly (e.g., turbine assembly), a rotating shaft of an engine or an industrial machine, or the like.

The imaging device 208 acquires the image data over time as the target object 210 rotates. As long as the frame acquisition rate of the imaging device 208 differs from the frequency at which the wheel 210 rotates, then at least some of the image frames of the video include different portions 216 of the wheel 210. The frequency at which the wheel 210 rotates is also referred to herein as the rotational speed or revolutions per minute (RPMs) of the wheel 210. For example, a first image frame acquired by the imaging device 208 may capture or depict the portion or area 216 of the wheel 210 shown in FIG. 2, and a subsequent, second image frame acquired by the imaging device 208 at a designated frame acquisition rate may capture or depict a portion or area of the wheel 210 that is at least partially different than the portion 216 due to the rotation of the wheel 210. As the wheel 210 rotates along multiple revolutions, the aggregated image frames acquired by the imaging device 208 may eventually depict the entire perimeter of the wheel 210. Furthermore, the aggregated image frames may depict some common portions of the wheel 210 that were acquired during different revolutions of the wheel 210 over time. For example, a subset of the image frames in the video may show the illustrated portion 216 of the wheel 210 during different revolutions of the wheel over time. The video (e.g., the aggregated image frames) acquired by the imaging device 208 is obtained by the controller 202 for analysis and eventual object recognition using the neural network 102 (shown in FIG. 1).

Optionally, the controller 202 is operably coupled to an input/output (I/O) device 222. The I/O device 222 may include a display and/or a user interface that allows an operator to interact with the controller 202. The display may be a liquid crystal display (e.g., light emitting diode (LED) backlight), an organic light emitting diode (OLED) display, a plasma display, a CRT display, and/or the like. The display may be configured to display input images and/or output images stored in the memory 206. The user interface is configured to receive inputs from the operator of the image analysis system 200. The user interface may include a keyboard, a mouse, a touchpad, one or more physical buttons, and/or the like. Optionally, the display may be a touch screen display, which includes at least a portion of the user interface. Optionally, the I/O device may include additional outputs, such as audio speakers, vibrating devices, or the like, for alerting the operator.

Figure 3:
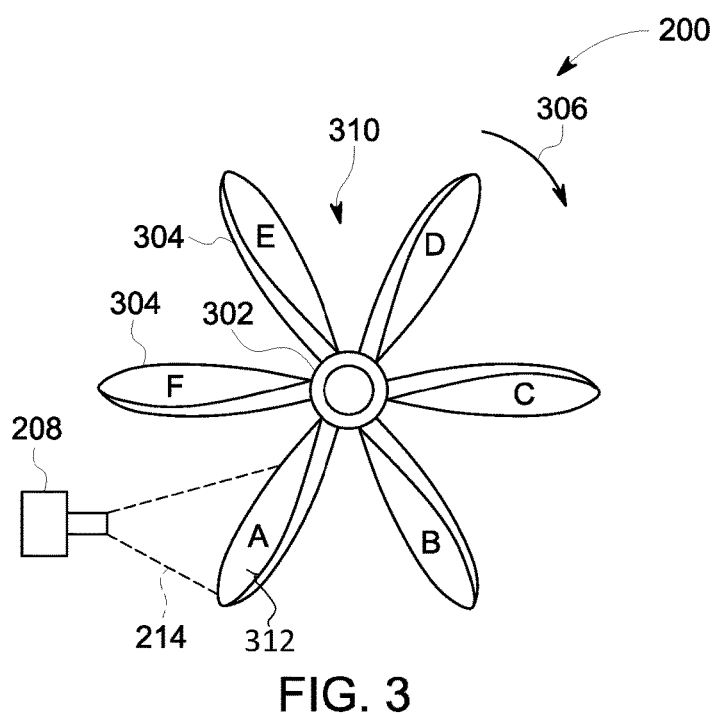
FIG. 3 illustrates a portion of the image analysis system according to an embodiment.

FIG. 3 illustrates a portion of the image analysis system 200 according to another embodiment in which the target object 210 is a rotor assembly instead of a wheel. For example, the rotor assembly 310 includes a central drum or shaft 302 and multiple rotor blades 304 extending radially outward from the drum 302. The blades 304 are spaced apart along a perimeter of the drum 302. In an embodiment, the rotor assembly 310 may be a turbine used in a power plant, a jet engine, a turbocharger, or the like, and the blades 304 may be airfoils of the turbine. The rotor assembly 310 in the illustrated embodiment includes six blades 304 (labeled A, B, C, D, E, and F), but may include a different number of blades 304 in other embodiments. For example, the rotor assembly 310 may include dozens or hundreds of blades 304. The rotor assembly 310 is configured to rotate about the drum 302. As described above with reference to FIG. 2, the imaging device 208 is positioned such that each acquired image frame depicts at least a portion of the target object 210 (e.g., the rotor assembly). In the illustrated embodiment, the field of view 214 of the imaging device 208 captures the blades 304. More specifically, some image frames acquired by the imaging device 208 may depict only a single blade 304, such as the blade 304A shown in FIG. 3. Other image frames acquired by the imaging device 208 may depict multiple blades 304, such as a portion of the blade 304A and a portion of the blades 304B. The rotor assembly 310 rotates in a clockwise direction 306 such that the blades 304A, 304B, 304C, 304D, 304E, 304F pass beyond the imaging device 208 in that order. Alternatively, the rotor assembly 310 may be controlled to rotate in an opposite counter-clockwise direction.

Figure 4:
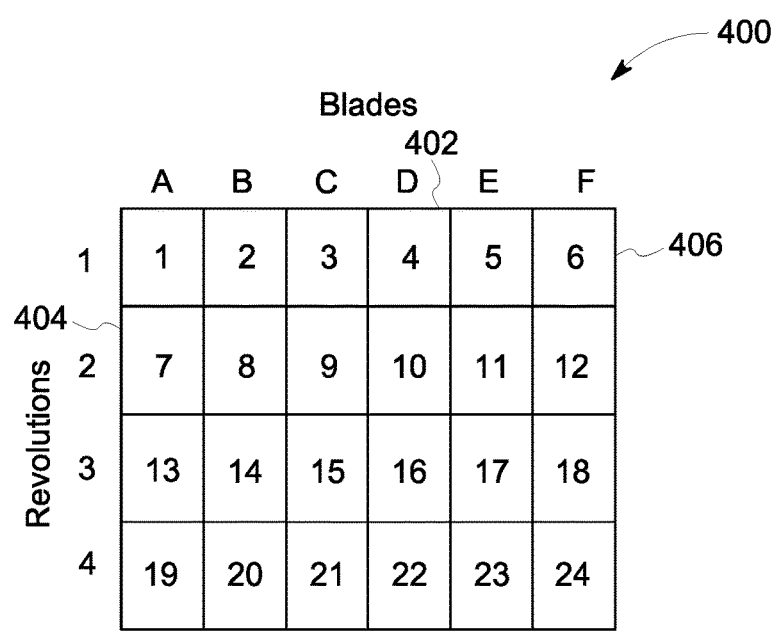
FIG. 4 is a chart showing which blade of a rotor assembly is depicted in each of a series of image frames acquired by an imaging device while the rotor assembly rotates in a clockwise direction.

With continued reference to FIG. 3, FIG. 4 is a chart 400 showing which blade 304 of the rotor assembly 310 is depicted in each of a series of image frames acquired by the imaging device 208 while the rotor assembly 310 rotates in the clockwise direction 306. The x-axis 402 represents the six blades 304A, 304B, 304C, 304D, 304E, 304F of the rotor assembly 310. The y-axis 404 represents revolutions of the rotor assembly 310 over time. In the illustrated embodiment, the imaging device 208 acquires image data at a frame acquisition rate of 24 image frames per second. The 24 image frames acquired by the imaging device 208 in one second are plotted in the chart 400. For example, each discrete cell 406 represents one of the 24 image frames. The rotor assembly 310 in the illustrated embodiment rotates at a frequency or speed of four revolutions per second (e.g., 240 RPMs). Therefore, the four revolutions of the rotor assembly 310 during one second are shown in the chart 400 along the y-axis 404. It is assumed that the six blades 304 of the rotor assembly 310 are evenly spaced apart along the perimeter of the drum 302.

As shown in the chart 400, the first image frame (e.g., 1) acquired by the imaging device 208 depicts the blade 304A. As the rotor assembly 310 rotates, the second image frame (e.g., 2) depicts the blade 304B, and this pattern continues through the sixth image frame (e.g., 6) that depicts the blade 304F. After acquiring the sixth image frame, the rotor assembly 310 completes the first revolution and begins a second revolution. Therefore, the seventh image frame acquired by the imaging device 208 once again depicts the blade 304A. In the one second of video data acquired, each of the blades 304A-304F is depicted in four different image frames. For example, the blade 304A is depicted in image frames 1, 7, 13, and 19, and the blade 304C is depicted in the image frames 3, 9, 15, and 21. It is noted that although each of the image frames 1, 7, 13, and 19 depict a common blade 304A, the image frames 1, 7, 13, and 19 were acquired or captured at different times. For example, if the imaging device 208 records video of the rotor assembly 310 for an hour (instead of just one second) at these rates, each of the blades 304A-304F would be depicted in 14,400 image frames during the hour.

The rates used in the example above were selected for ease of description, and may not represent the actual rate at which the rotor assembly 310 or other target object rotates and/or the rate at which the imaging device 208 acquires video data. For example, the rotor assembly 310 may rotate at a rotational speed that is faster than four revolutions per second. In another embodiment, the rotor assembly 310 rotates at eight revolutions per second (e.g., 480 RPMs). Assuming that the imaging device 208 still acquires video data at the same frame acquisition rate of 24 frames per second, it is noted that the blades 304A-304F would each still be depicted in four image frames per second. For example, the first image frame depicts the blade 304A; the second image frame depicts the blade 304C; the third image frame depicts the blade 304E; the fourth image frame depicts the blade 304B; the fifth image frame depicts the blade 304D; the sixth image frame depicts the blade 304F; the seventh image frame depicts the blade 304A; and so on.

In an embodiment, the controller 202 (shown in FIG. 2) is configured to obtain the video of the rotating rotor assembly 310, and analyzes the video to group the image frames of the video into multiple sets of image frames. The image frames in each set depict a common portion of the target object, which in the illustrated embodiment is a common blade 304 of the rotor assembly 310. For example, the controller 202 is configured to determine which image frames depict each of the blades 304A-304F based on (i) the starting position of the rotor assembly 310 relative to the imaging device 208, (ii) the number of blades 304 in the rotor assembly 310, (iii) the frame acquisition rate of the imaging device 208, and (iv) the frequency or rotational speed of the rotor assembly 310. As shown in the chart 400, if the rotor assembly 310 has six blades 304, the imaging device 208 acquires video data at 24 frames per second starting with an image frame depicting the blade 304A, and the rotor assembly 310 rotates at four revolutions per second, then the controller 202 determines that the $1^{st}$, $7^{th}$, $13^{th}$, and $19^{th}$ image frames every second depict the blade 304A. Using the same logic, the controller 202 can determine which of the blades 304B-304F is depicted in each of the twenty other image frames acquired every second.

In an alternative embodiment, the controller 202 is configured to look for breaks or interruptions in the video that occur between blades 304 as the rotor assembly 310 rotates. For example, the controller 202 analyzes the video for repeating patterns in the image frames indicative of a space or break between adjacent blades. Knowing the number of blades 304 on the rotor assembly 310 (and the initial blade 304 depicted in a starting image frame of the video), the controller 202 can use the detected breaks to determine which blades 304 are depicted in each image frame. After the determination, the controller 202 can group the image frames such that the image frames depicting a common blade 304 are grouped in the same set. In this alternative embodiment, the rotational speed of the rotor assembly 310 does not need to be monitored.

Figure 5:
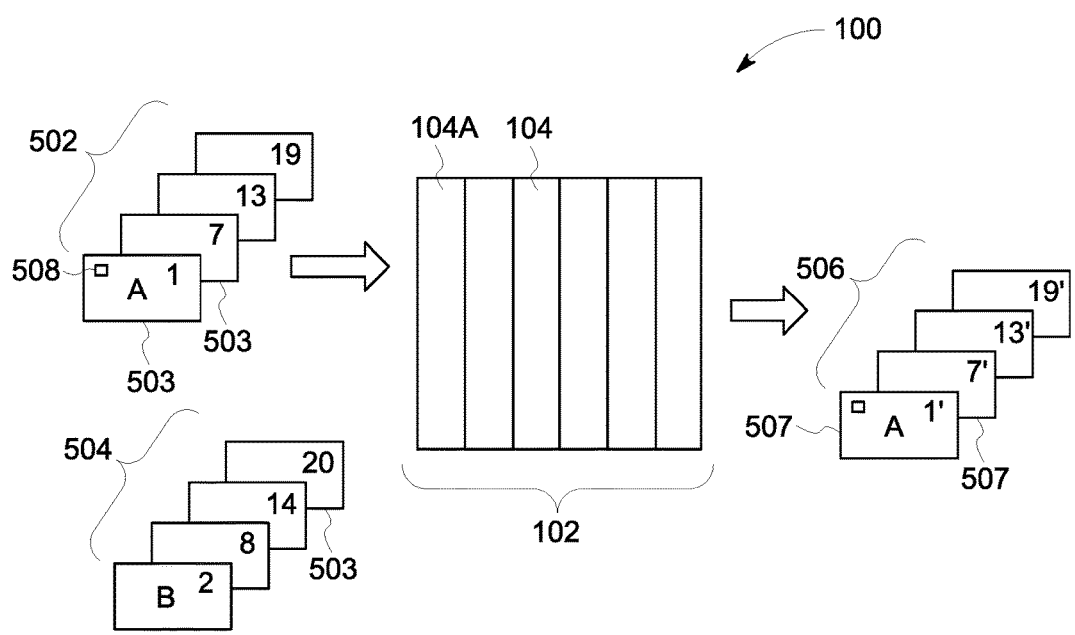
FIG. 5 illustrates one embodiment of the neural network system showing multiple sets of image frames poised for examination using an artificial neural network.

FIG. 5 illustrates one embodiment of the neural network system 100 showing multiple sets 502, 504 of image frames 503 poised for examination using the artificial neural network 102. The controller 202 (shown in FIG. 2) is configured to group the image frames of the video into multiple sets, such that the image frames in each set depict a common portion of the target object. For example, FIG. 5 shows a first set 502 that includes the $1^{st}$, $7^{th}$, $13^{th}$, and $19^{th}$ image frames 503 acquired by the imaging system 208, and a second set 504 that includes the $2^{nd}$, $8^{th}$, $14^{th}$, and $20^{th}$ image frames 503. The image frames 503 of the different sets 502, 504 depict different portions of the target object. For example, the image frames 503 in the first set 502 depict the blade 304A (shown in FIG. 3), and the image frames 503 in the second set 504 depict the blade 304B (FIG. 3). In an embodiment in which the target object is a rotating wheel or shaft, the image frames in different sets may depict different areas along a perimeter of the wheel or shaft. Although only two sets 502, 504 are shown, the controller 202 may be configured to group the image frames 503 into six different sets such that the image frames of each set depict a different one of the six blades 304A-304F. The image frames 503 in each set 502, 504 may be acquired during different revolutions of the target object, as shown in the chart 400 in FIG. 4. It is recognized that each set 502, 504 may include more than four image frames 503, such as hundreds of image frames acquired at different times over a duration of minutes, hours, or days.

The controller 202 is configured to examine all, or at least one, of the grouped sets of image frames 503 through the layers 104 of artificial neurons of the artificial neural network 102 for automated object-of-interest recognition by the neural network 102. For example, as shown in FIG. 5, the controller 202 may introduce the first set 502 of image frames 503 (including the $1^{st}$, $7^{th}$, $13^{th}$, and $19^{th}$ frames) to the input layer 104A of the neural network 102. In one embodiment, the image frames 503 of the first set 502 are introduced one at a time as input images in a forward propagation direction through the layers 104 of the artificial neural network 102. For example, the $1^{st}$ image frame may be introduced as a first input image, the $7^{th}$ image frame may be introduced as a second input image after the first input image, and the $13^{th}$ and $19^{th}$ image frames are introduced as third and fourth input images, respectively. The first input image may be examined in the neural network 102 prior to the second input image, which is examined prior to the third input image, etc.

As described above with reference to FIG. 1, two or more layers 104 of the neural network 102 apply various weights in various functions to each of the input images to identify the probabilities that various objects-of-interest appear in the input images. The neural network 102 determines object class probabilities for each of the pixels 508 in the image frames that represent the input images. The object class probabilities are determined by the neural network 102 calculating likelihoods that the pixels 508 represent different object classes. Some of the object classes represent different types of objects-of-interest. For example, in the embodiment in which the image frames of the set 502 depict the blade 304A of the rotor assembly 310 (shown in FIG. 3), a first object class may represent an intact coating or barrier on the blade 304A, a second object class may represent an object in the background behind the blade 304A (e.g., such as a portion of the blade 304B), a third object class may represent a spalling area, and a fourth object class may represent a crack 312 (shown in FIG. 3) in the blade 304A. The spalling area and the crack are different types of objects-of-interest. The spalling area is an area in which the coating or barrier (e.g., a thermal barrier) on the blade 304A is flaking and/or has flaked off. Both the spalling area and the crack, if detected, can indicate that the blade 304A is damaged and that the rotor assembly 310 may require maintenance. An example pixel in one of the image frames of the set 502 may be determined by the neural network 102 to have a classification vector of [0.1 0.15 0.6 0.15], which indicates that the pixel has a 60% probability of representing a spalling area along the blade 304A. The neural network 102 may be configured to select the highest probability for each pixel 508 in the image frames, and using the selected probability to convert the classification vector of the corresponding pixel 508 to a one-hot vector. With respect to the preceding example, this involves converting the vector of the pixel 508 from [0.1 0.15 0.6 0.15] to [0 0 1 0].

In an embodiment, the neural network 102 may be a recurrent neural network that uses long-term information from previous image frames for video analytics. For example, the image frames 503 of the set 502 are examined one at a time. When examining the $13^{th}$ image frame 503, the recurrent neural network 102 can use information gleaned from previously examining the $1^{st}$ and $7^{th}$ image frames 503. The recurrent neural network 102 may be a long short term memory (LSTM) network that combines long-term information from previous frames with spatial (e.g., visual) features from convolutional neural networks to provide an accurate prediction of an object class in a current frame. For example, long-term information from previous frames is stored as a hidden (or cell) state in successive LSTM cells or layers 104. The information in the hidden state influences how a current input feature is analyzed and used, and also influences the information that is passed onto the subsequent LSTM layer as the hidden state.

The neural network 102 optionally generates a set 506 of output images 507. The output images 507 may resemble the input image frames 503, but do not exactly match the corresponding input image frames 503 because the neural network 102 may not be 100% accurate in predicting what objects are represented by different pixels.

In addition to, or as an alternative to, outputting the set 506 of images 507 that resemble the image frames 503 of the first set 502, the neural network 102 may be configured to use the object recognition of one or more objects in the image frames 503 for automatically implementing one or more responsive actions. As one example, the neural network 102 can output a signal to a controller responsive to identifying an object in an image to automatically schedule maintenance or begin repair of a surface of an engine component or wheel, such as by spraying a restorative additive onto a thermal barrier coating of a blade of a rotor assembly. As another example, the neural network can output a signal to a controller responsive to identifying an object in an image to automatically stop movement or change a direction of movement of a rotor assembly, a vehicle, or the like. Automatically stopping movement of a vehicle could be implemented so as to avoid a collision between the vehicle and an object identified from the images. In one embodiment, one or more processors integral to the neural network 102 output a signal to the controller 202 (shown in FIG. 2) for the controller 202 to alert an operator via the I/O device 222 (FIG. 2), automatically schedule maintenance, and/or automatically stop rotation and/or movement of the target object. In an alternative embodiment, the controller 202 uses the neural network 102 to identify an object in an image, and the controller 202 outputs a signal to another controller, such as a vehicle controller, a controller at a remote scheduling location, or the like, to implement the appropriate remedial action based on the type of object that is detected.

In an embodiment, after identifying whether or not any objects-of-interest, such as spalling or cracks 312, are present on the blade 304A of the rotor assembly 310 by examining the image frames 503 of the first set 502 in the neural network 102, the controller 202 may examine the image frames 503 of the second set 504 and/or other sets of grouped image frames in the neural network 102. For example, the controller 202 may be configured to check each of the blades 304A-304F for spalling and cracks 312 by examining six different sets of image frames in the neural network 102. Alternatively, the controller 202 may be tasked with only checking a specific subset of the blades 304A-304F for spalling and cracks 312, such that the controller 202 examines only a specific set or sets of image frames in the neural network 102 associated with the target blades.

Figure 6:
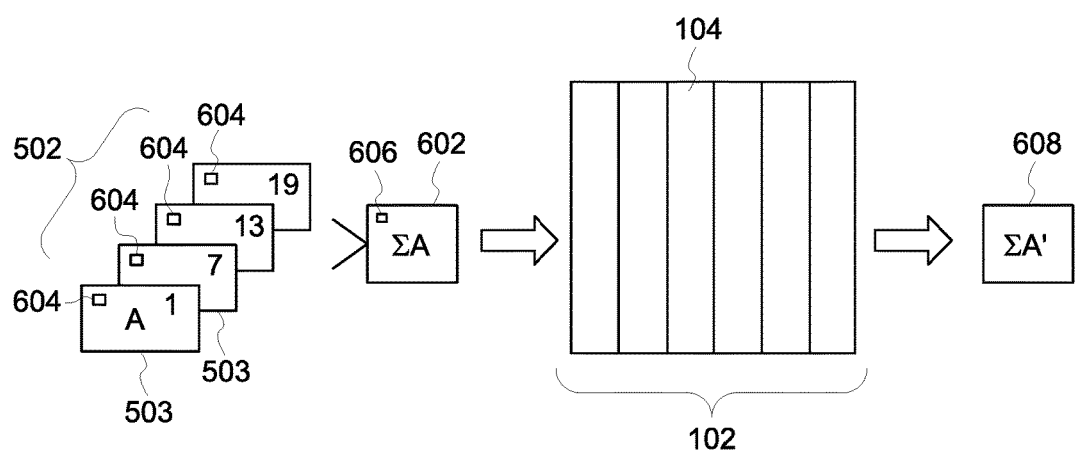
FIG. 6 illustrates an alternative embodiment of the neural network system.

FIG. 6 illustrates an alternative embodiment of the neural network system 100. In the illustrated embodiment, instead of examining each of the image frames 503 of the set 502 as individual input images for the neural network 102, the image frames 503 within the set 502 are used to generate a combined image 602. The combined image 602 is then examined by the artificial neurons in the various layers 104 of the neural network 102 as a single input image. The combined image 602 may be generated by combining pixels characteristics from all of the image frames 503 of the set 502. For example, the characteristics of a specific pixel 604 in the $1^{st}$ image frame 503, such as intensity, color, and/or the like, are combined with the characteristics of the three pixels 604 in the $7^{th}$, $13^{th}$, and $19^{th}$ image frames 503 that are located in the same relative locations as the pixel 604 in the $1^{st}$ image frame 503. The characteristics of the pixel 606 in the combined image 602 are determined based on the characteristics of the corresponding pixels 604 in the image frames 503 of the set 502. The characteristics of the pixel 606 may be determined by calculating the average or median of the characteristics of the four pixels 604. For example, the wavelengths of the pixels 604 in the image frames 503 may be determined by the controller 202 (or the one or more processors 204 thereof) using image analysis. The wavelengths of the pixels 604 can then be used to generate or calculate an average or median value, which is assigned to the pixel 606 to represent the color (e.g., wavelength) of the pixel 606. The same or similar calculations can be used for generating the intensity and/or other characteristics of the pixels that form the combined image 602.

When the combined image 602 is examined by the artificial neurons in the layers 104 of the neural network 102, the neural network 102 may generate an output image 608. The output image 608 may resemble the input combined image 602, without exactly matching the combined image 602 due to the neural network 102 not being 100% accurate in predicting what objects are represented by different pixels. As described above, the neural network 102 may be configured to use the object recognition of one or more objects in the combined image 602 for automatically implementing one or more responsive actions instead of, or in addition to, producing the output image 608.

Figure 7:
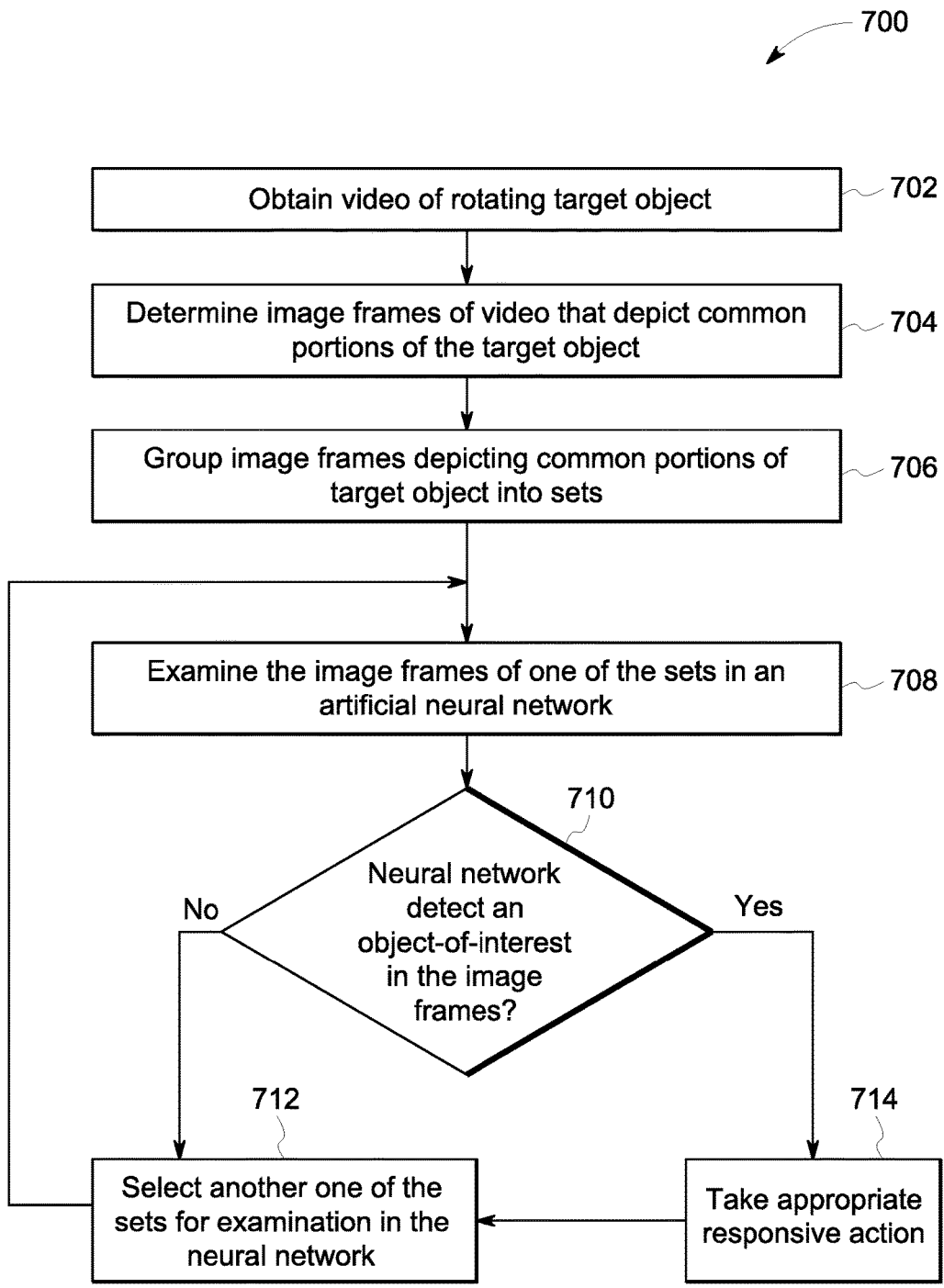
FIG. 7 is a flowchart of one embodiment of a method for object prediction in video data using one or more deep neural networks.

FIG. 7 is a flowchart of one embodiment of a method 700 for prediction of objects in video data using one or more deep neural networks. The method 700 can represent the operations performed by the one or more processors 204 of the controller 202 shown in FIG. 2 and/or processors of the neural network 102 shown in FIG. 1 to improve the accuracy in automatically recognizing objects captured in video data. The method 700 can represent an algorithm used to create (e.g., write) one or more software applications that direct operation of the neural network.

At 702, video of a rotating target object is obtained. The video is video data of image frames or data acquired over time. The video may be obtained by one or more processors directly from an imaging device that acquires the video or from a memory that stores the video. The target object may be a rotor assembly, a shaft of an engine, a wheel of a vehicle, or the like. The video captures multiple revolutions of the target object. The imaging device that acquires the video may be positioned relative to the target object such that the field of view of the imaging device captures a portion or area at least proximate to an outer perimeter of the target object, such as an area along a perimeter of a wheel or a blade of a rotor assembly that includes multiple blades.

At 704, the image frames of the video that depict common portions of the target object are determined. In an embodiment, this determination is made without the use of image analysis. Instead, the determination is made using properties and parameters of the imaging device and the target object, such as (i) the rotational speed or frequency of the rotating target object, (ii) the frame acquisition rate of the imaging device, and (iii) the starting position of the target object relative to the imaging device when the imaging device begins to acquire the video. Some other properties and parameters that may be known and used in the determination may include, the distance of the imaging device from the target object, the field of view size of the imaging device, the size (e.g., diameter, circumference, etc.) and/or number of discrete parts or portions (e.g., blades) of the target object, and the like. The rotational speed or frequency of the target object may be measured using a sensor. The frame acquisition rate of the imaging device may be a designated setting of the imaging device. Using the information above, the one or more processors are configured to determine, based on the rotational speed of the target object and the frame acquisition rate of the imaging device, which of multiple image frames depict a common portion of the target object. At least some of the image frames depicting the same portion of the target object were captured or acquired during different revolutions of the target object. For example, it may be determined that a first image frame depicts a first blade of a rotor assembly during a first revolution of the rotor assembly, and that a $7^{th}$ image frame, a $13^{th}$ image frame, and a $19^{th}$ image frame of the video also depict the first blade during second, third, and fourth revolutions of the rotor assembly, respectively.

At 706, the image frames that depict common portions of the target object are grouped into sets. For example, with a target object of a rotor assembly having 24 blades, the image frames of the video may be grouped into 24 different sets, such that the image frames in each set depict a different one of the blades. In another example in which the target object is a wheel and each image frame depicts an area that is one-twelfth of the outer perimeter of the wheel, the image frames of the video may be grouped into 12 different sets, with the image frames in each set depicting a different area or portion of the wheel along the outer perimeter.

At 708, one of the sets of image frames is examined in an artificial neural network for object recognition in the image frames. In one embodiment, the image frames of the set are introduced to the neural network individually one at a time as input images. The neural network optionally may be a recurrent neural network, such as a LSTM network, as described above, that uses information from previously-examined image frames of the set during the examination of a current image frame of the set. In an alternative embodiment, the image frames of the set may be aggregated to generate a combined image, and the combined image is introduced into the neural network as an input image.

At 710, it is determined whether the neural network detects an object-of-interest in the set of image frames. In an embodiment, the neural network is configured to detect spalling of a coating on the target object and/or cracks along the target object as two objects-of-interest. But, the neural network may be configured to detect additional and/or different objects-of-interest in other embodiments, such as wear patterns, debris and other foreign objects, and the like. The neural network, or the processors thereof, may determine whether any objects-of-interest are present in the set of image frames by using multiple layers of artificial neurons associated with various functions and various weights to examine the image frames (or the combined image). The neural network may examine an image frame by determining object class probabilities of pixels in the image frame. The object class probabilities indicate likelihoods that the pixels represent different types of objects, such as objects-of-interest. The neural network may be configured to predict an object class for each of the pixels in the examined image frame by selecting for a given pixel the object class with the highest probability reflected in the object class probability. Thus, if an object class probability of a given pixel has a 70% likelihood that the pixel represents a crack, then the neural network selects that the pixel is a crack, although there is a calculated 30% probability that the pixel actually does not represent a crack. In this example, since the pixel is predicted to represent a crack, which is an object-of-interest, then the neural network detects that an object-of-interest is present in the examined image frame.

If the neural network does not detect an object-of-interest in the set of image frames that is examined, then flow proceeds to 712, and another one of the sets of image frames (depicting a different portion of the target object) may be selected for examination using the neural network. For example, a set that depicts the next blade of a rotor assembly, the next area (e.g., segment) of a wheel or shaft, or the like, may be selected for examination in the neural network. The one or more processors may sequentially examine all of the sets of image frames. Alternatively, the one or more processors examine only a select subset of the sets of image frames that are designated, such as by an instruction received from an operator. From 712, flow of the method 700 may return to 708 for examining the selected set of image frames in the neural network.

If, on the other hand, the neural network detects an object-of-interest in the set of image frames that is examined, then flow proceeds to 714, and appropriate remedial or responsive action is taken. For example, processors in the neural network may output a signal to a controller responsive to identifying an object-of-interest in an image to automatically (i) activate an output device (e.g., audio speakers, lights, display, vibration device, etc.) to alert an operator, (ii) schedule maintenance for the target object, or (iii) begin repair of a surface of the target object. The repair could involve, for example, spraying a restorative additive onto a thermal barrier coating of a blade of a rotor assembly. As another example, the processors in the neural network can output a signal to a controller for the controller to automatically stop movement or change a direction of movement of a rotor assembly, a vehicle, or the like, responsive to detecting the object-of-interest. Automatically stopping movement of a vehicle could be implemented so as to avoid a collision between the vehicle and an object identified from the images. The responsive or remedial action that is taken may depend on the type and/or properties (e.g., size, color, etc.) of the object-of-interest detected in the image frames. For example, scheduling maintenance may be appropriate for a small crack that is detected in a blade of a rotor assembly, and automatically stopping movement of the rotor assembly may be appropriate for a large crack.

After taking the responsive action at 714, the method 700 may continue to 712 to select another set of image frames to examine in the neural network, or may end.

In one embodiment, a method (e.g., for analyzing images) includes obtaining a series of images of a rotating target object through multiple revolutions of the target object. The method includes grouping the images into multiple, different sets of images. The images in each of the different sets depict a common portion of the target object. At least some of the images in each set are obtained during a different revolution of the target object. The method further includes examining the images in at least a first set of the multiple sets of images using an artificial neural network for automated object-of-interest recognition by the artificial neural network.

Optionally, the images are different frames of a video of the target object.

Optionally, the images of the different sets depict different portions of the target object.

Optionally, the target object is a turbine assembly including multiple airfoils.

The images in each set depict a common airfoil of the turbine assembly.

Optionally, the artificial neural network is a long short term memory neural network.

Optionally, the images are grouped into the different sets of images based on the frequency at which the target object rotates.

Optionally, the images are grouped into the different sets of images based on a frame acquisition rate at which the images are acquired over time.

Optionally, the target object is a turbine assembly including multiple airfoils. The images are grouped into the different sets of images based on how many of the airfoils are included in the turbine assembly.

Optionally, examining the images in the first set includes examining each of the images one at a time as input images in a forward propagation direction through layers of artificial neurons in the artificial neural network.

Optionally, examining the images in the first set includes determining object class probabilities of pixels in the input images. The object class probabilities indicate likelihoods that the pixels represent different types of objects-of-interest in the input images.

Optionally, the different types of objects-of-interest include at least one of spalling or cracks in the target object.

Optionally, the method further includes generating a combined image by combining pixel characteristics from the images in the first set. Examining the images in the first set includes examining the combined image as an input image in a forward propagation direction through layers of artificial neurons in the artificial neural network.

Optionally, the method further includes, responsive to the artificial neural network recognizing an object-of-interest in the images of the first set, outputting a signal to a controller having one or more processors to one or more of automatically schedule maintenance for the target object or automatically stop rotation of the target object.

In one embodiment, a system (e.g., an image analysis system) includes a digital memory and one or more processors. The digital memory stores an artificial neural network. The one or more processors are configured to obtain a series of images of a rotating target object through multiple revolutions of the target object. The one or more processors are configured to group the images into multiple, different sets of images. The images in each of the different sets depict a common portion of the target object. At least some of the images in each set are obtained during a different revolution of the target object. The one or more processors are further configured to examine the images in at least a first set of the multiple sets of images using the artificial neural network stored in the memory for automated object-of-interest recognition by the artificial neural network.

Optionally, the images of the different sets depict different portions of the target object.

Optionally, the target object is one or more of a wheel, a shaft of an engine, or a rotor assembly including multiple blades. The images in each of the different sets depict either a common area of the wheel, a common area of the shaft, or a common blade of the rotor assembly.

Optionally, the artificial neural network stored in the memory is a long short term memory neural network.

Optionally, the one or more processors are configured to group the images into the different sets based on a speed at which the target object rotates and based on a frame acquisition rate at which an imaging device obtains the images over time.

In one embodiment, a method (e.g., for analyzing images) includes obtaining video of a rotating rotor assembly through multiple revolutions of the rotor assembly. The video includes a series of image frames over time. The rotor assembly includes multiple blades. The method includes grouping the image frames of the video into multiple, different sets of image frames. The image frames in each of the different sets depict a common blade of the rotor assembly. At least some of the image frames in each set are obtained during a different revolution of the rotor assembly. The method also includes examining the image frames in at least a first set of the multiple sets of image frames using an artificial neural network for automated object-of-interest recognition by the artificial neural network. The image frames in the first set depict a first blade of the rotor assembly, and the artificial neural network is configured to recognize at least one of spalling or cracks on the first blade as objects-of-interest.

Optionally, the method further includes, responsive to the artificial neural network recognizing at least one of spalling or a crack on the first blade, outputting a signal to a controller having one or more processors to one or more of automatically schedule maintenance for the rotor assembly or automatically stop rotation of the rotor assembly.

Optionally, the image frames of the different sets depict different blades of the rotor assembly.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
    obtaining a series of images of a rotating target object through multiple revolutions of the target object;
    grouping the images into multiple, different sets of images, the images in each of the different sets depicting a common portion of the target object, at least some of the images in each set obtained during a different revolution of the target object; and
    examining the images in at least a first set of the multiple sets of images using an artificial neural network for automated object-of-interest recognition by the artificial neural network;
    wherein examining the images in the first set includes examining each of the images one at a time as input images in a forward propagation direction through layers of artificial neurons in the artificial neural network.

2. The method of claim 1, wherein the images are different frames of a video of the target object.

3. The method of claim 1, wherein the images of the different sets depict different portions of the target object.

4. The method of claim 1, wherein the target object is a turbine assembly including multiple airfoils, the images in each set depicting a common airfoil of the turbine assembly.

5. The method of claim 1, wherein the artificial neural network is a long short term memory neural network.

6. The method of claim 1, wherein the images are grouped into the different sets of images based on the frequency at which the target object rotates.

7. The method of claim 1, wherein the images are grouped into the different sets of images based on a frame acquisition rate at which the images are acquired over time.

8. The method of claim 1, wherein the target object is a turbine assembly including multiple airfoils, and wherein the images are grouped into the different sets of images based on how many of the airfoils are included in the turbine assembly.

9. The method of claim 1, wherein examining the images in the first set includes determining object class probabilities of pixels in the input images, the object class probabilities indicating likelihoods that the pixels represent different types of objects-of-interest in the input images.

10. The method of claim 9, wherein the different types of objects-of-interest include at least one of spalling or cracks in the target object.

11. The method of claim 1, further comprising generating a combined image by combining pixel characteristics from the images in the first set, wherein examining the images in the first set includes examining the combined image as an input image in a forward propagation direction through layers of artificial neurons in the artificial neural network.

12. The method of claim 1, further comprising, responsive to the artificial neural network recognizing an object-of-interest in the images of the first set, outputting a signal to a controller having one or more processors to one or more of automatically schedule maintenance for the target object or automatically stop rotation of the target object.

13. A system comprising:
    a digital memory that stores an artificial neural network; and
    one or more processors configured to obtain a series of images of a rotating target object through multiple revolutions of the target object, the one or more processors configured to group the images into multiple, different sets of images, the images in each of the different sets depicting a common portion of the target object, at least some of the images in each set obtained during a different revolution of the target object, the one or more processors further configured to examine the images in at least a first set of the multiple sets of images using the artificial neural network stored in the memory for automated object-of-interest recognition by the artificial neural network;
    wherein the one or more processor is further configured to generate a combined image by combining pixel characteristics from the images in the first set, wherein examining the images in the first set includes examining the combined image as an input image in a forward propagation direction through layers of artificial neurons in the artificial neural network.

14. The system of claim 13, wherein the images of the different sets depict different portions of the target object.

15. The system of claim 13, wherein the target object is one or more of a wheel, a shaft of an engine, or a rotor assembly including multiple blades, the images in each of the different sets depicting either a common area of the wheel, a common area of the shaft, or a common blade of the rotor assembly.

16. The system of claim 13, wherein the artificial neural network stored in the memory is a long short term memory neural network.

17. The system of claim 13, wherein the one or more processors are configured to group the images into the different sets based on a speed at which the target object rotates and based on a frame acquisition rate at which an imaging device obtains the images over time.

18. A method comprising:
obtaining video of a rotating rotor assembly through multiple revolutions of the rotor assembly, the video including a series of image frames over time, the rotor assembly including multiple blades;
grouping the image frames of the video into multiple, different sets of image frames, the image frames in each of the different sets depicting a common blade of the rotor assembly, at least some of the image frames in each set obtained during a different revolution of the rotor assembly; and
examining the image frames in at least a first set of the multiple sets of image frames using an artificial neural network for automated object-of-interest recognition by the artificial neural network, wherein the image frames in the first set depict a first blade of the rotor assembly and the artificial neural network is configured to recognize at least one of spalling or cracks on the first blade as objects-of-interest;
wherein the method further comprises generating a combined image by combining pixel characteristics from the image frames in the first set, wherein examining the images in the first set includes examining the combined image as an input image in a forward propagation direction through layers of artificial neurons in the artificial neural network.

19. The method of claim 18, further comprising, responsive to the artificial neural network recognizing at least one of spalling or a crack on the first blade, outputting a signal to a controller having one or more processors to one or more of automatically schedule maintenance for the rotor assembly or automatically stop rotation of the rotor assembly.

20. The method of claim 18, wherein the image frames of the different sets depict different blades of the rotor assembly.

* * * * *